Patented Feb. 10, 1931

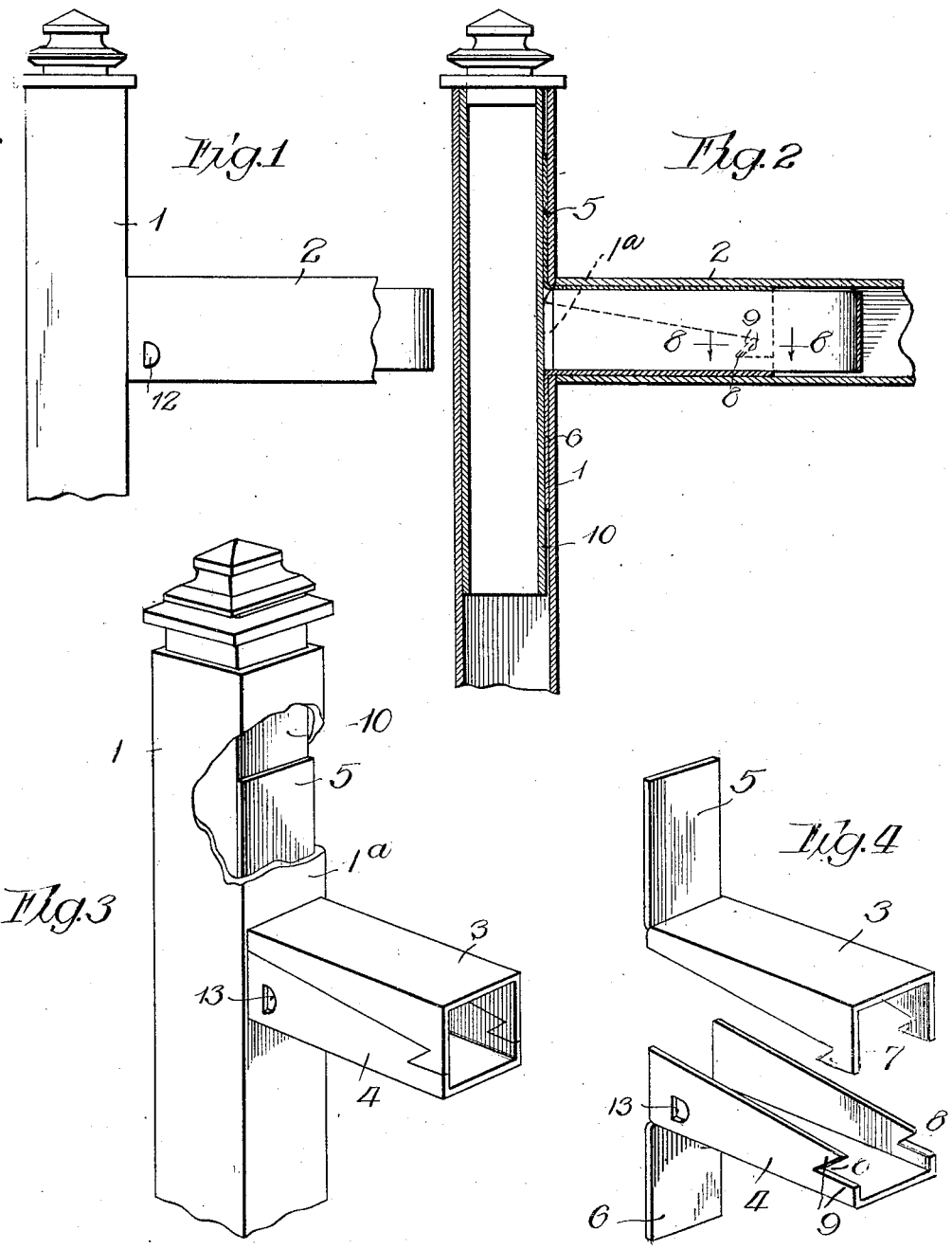

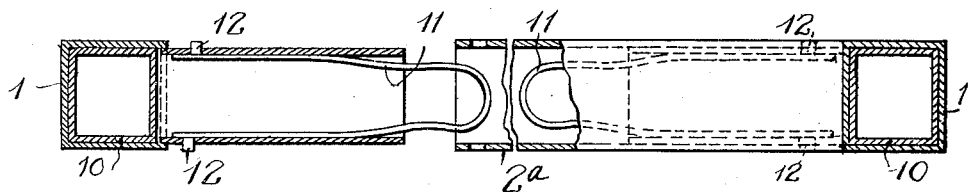
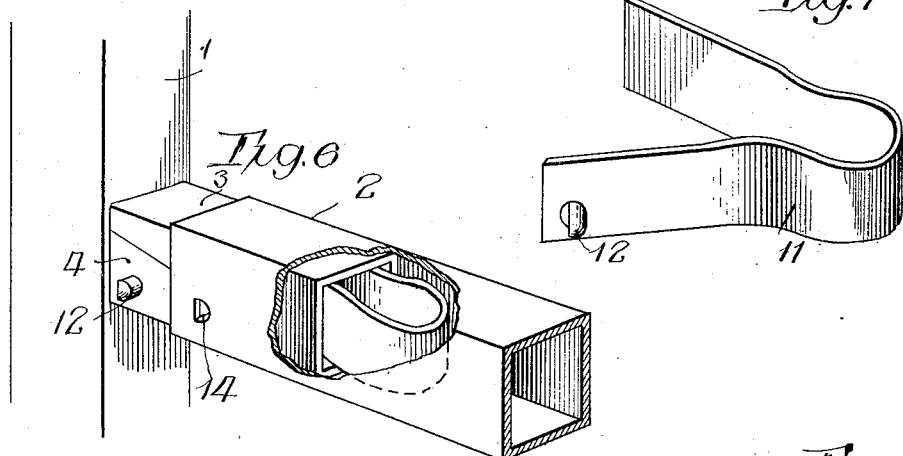
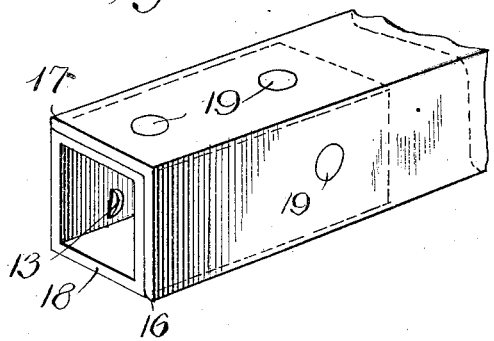
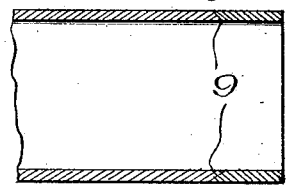
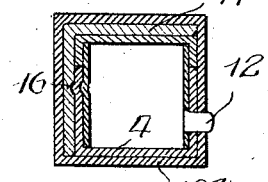
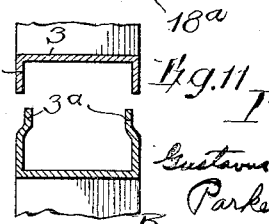

1,792,100

UNITED STATES PATENT OFFICE

GUSTAVUS A. E. KOHLER, OF CHICAGO, ILLINOIS

CONNECTION FOR CONNECTING ANGULAR MEMBERS TOGETHER

Application filed December 26, 1919. Serial No. 347,405.

This invention relates to a new and improved connection for connecting angular members together, and has for its object to provide a new and improved connection of this description which shall be cheap in construction, and which can be easily and quickly assembled and which when assembled will form a rigid, detachable connection between such angular members. The connection may be used in constructions wherever it is desirable to connect angular members together, such as furniture, building constructions, ladders, joints and the like. The invention has other objects which are more specifically set out in the description following.

Referring now to the accompanying drawings

Fig. 1 is a view showing one form of connection embodying the invention;

Fig. 2 is a vertical sectional view therethrough;

Fig. 3 is a perspective view of the connection illustrated in Fig. 1 with parts broken away and parts omitted;

Fig. 4 is a perspective view of the two interlocking parts used in the connection;

Fig. 5 is a horizontal sectional view through the connection showing one of the angular members before the connection is completed;

Fig. 6 is a perspective view with parts broken away;

Fig. 7 is a view of one form of spring used in the connection;

Fig. 8 is a sectional view taken on line 8—8 of Fig. 2;

Fig. 9 is a perspective view showing a modified construction;

Fig. 10 is a cross sectional view showing a further modification;

Fig. 11 is a view showing a further modification;

Fig. 12 is a side view of the device illustrated in Fig. 11.

Like numerals refer to like parts throughout the several figures.

Referring now to the drawings I have shown a connection formed between the two angular members 1 and 2. These members are hollow and may be made of metal. One of the members, as for example the member 1, has an opening 1ª in one side. A connecting element is inserted in this opening and the other angular member is connected to this connecting element. The connecting element illustrated which is shown in Fig. 4, consists of two sections 3 and 4 which when placed together form a short hollow piece which fits into the member 2. The section 3 is provided with a lateral holding piece 5, while the section 4 is provided with a similar lateral holding piece 6. Means is provided for preventing these two sections sliding relatively so as to become out of alignment or separated. In the construction shown one of these sections is provided with projections 7, while the other one is provided with receiving spaces 8 for said projections. The edges of the projections and the receiving spaces are beveled as shown at 9 (see Fig. 8). This bevel is also shown in Fig. 4. In connecting the two angular members together the projection 5 of one section of the connecting element is inserted in the opening 1ª in the member 1, and the lateral holding projection 6 of the other section is also inserted in the opening, the two sections being inclined at an angle to the member 1 while this is being done. In other words the section 3 is tilted up during this process and the section 4 tilted down, and then the two sections are brought together as illustrated in Fig. 3, so that the lateral holding projections 5 and 6 engage the inner face of the member 1 above and below the opening 1ª. An interior holding member 10 is then inserted in the member 1 and is of such size that the holding projections 5 and 6 are held between it and the inner face of the member 1 as shown in Fig. 2. I prefer to have this interior member so that it makes a snug fit in the space left for it on the inside of the member 1. When this interior holding member is in position, the connecting element is in the position shown in Figs. 2 and 3 and then forms a rigid part, the projections 7 and the beveled faces 9 preventing any lateral movement of the outer ends of the sections 3 and 4. When thus assembled the connecting element is practically the same as if it were a unitary structure.

The member 2 is then slid upon the connecting element until it occupies the position illustrated in Figs. 1 and 2. Some means is provided for detachably locking the member 2 with the connecting element. I have illustrated in Fig. 7 one construction for this purpose which consists of a spring 11 bent back upon itself and inserted in the connecting element. This spring is provided with a projection 12 which passes through an opening 13 in the connecting element. This projection also passes through an opening 14 in the member 2. The projection is preferably provided with a beveled end so that when the member 2 is moved to its final position it will strike this beveled face and push the projection inwardly, the spring permitting this, and then when the opening 14 comes opposite the projection the spring will force the projection through said opening and thus lock the parts together.

In Fig. 5 I have shown one of the most common forms of construction wherein there are two vertical members 1, separated any desired distance, the two vertical members being connected by a cross member 2ª. The two vertical members each has the connecting element hereinbefore described. In a construction of this kind after the member 2 has been moved into position as hereinbefore described so that the projection 12 enters the opening 14 to lock the parts together, the connecting element attached to the other member 1 is then moved into position with relation to the other end of the member 2 and locked in a similar position. It will be noted that the angular members are now removably fastened together.

In Fig. 9 I have shown a modified construction for one of the angular members. In this construction the angular member instead of being a hollow member is made in the shape of an angle having the two sides 16 and 17. Connected at the end or ends of this angle member is a short hollow piece 18 which is fastened thereto in any desired manner as by means of fastening devices 19. A connecting member consisting of the pieces 3 and 4 is inserted in this hollow piece and the projection 12 enters the opening 13. This cheapens the construction and yet secures the same result so far as connecting the members together is concerned.

It will be noted that in Fig. 9 the short hollow piece 18 is on the inside of the angle member.

In Fig. 10 I have shown a further modification where there is an angle member similar to that shown in Fig. 9, having the sides 16 and 17. In this construction the short member 18ª is on the outside of the angle member instead of the inside and is suitably fastened thereto. The connecting element consisting of the parts 3 and 4 is inserted inside of the angle member as illustrated, and the projection 12 enters the opening in the short hollow piece 18ª to lock the parts together. This connection can be used in any construction where it is desired to connect angular members together, such as building constructions, furniture, ladders, toys and all other articles of manufacture where it is applicable.

I have described in detail a particular construction embodying the invention but it is of course evident that the parts may be varied in many particulars, without departing from the spirit of the invention as set forth in the claims hereto appended, and I therefore do not limit myself to the particular construction shown and described.

Instead of forming the sections 3 and 4 with the beveled faces 9, I may leave these faces 9 and form the piece 3 with projections 3ª on each side thereof, and the piece 4 with projections 4ª on each side thereof as shown. These projections may be formed integral therewith if desired and are bent inwardly so that the projections 3ª engage the inner faces of the part 4, while the projections 4ª engage the inner faces of the part 3 so as to prevent lateral movement of the parts. If desired the interior holding member 10 may be omitted, for when the members 2 are in position and the projection 12 in the opening 13, the ends of the member 2 engage the face of the member 1 so as to form a rigid connection and prevent distortion or displacement of the members when pressure is put upon them. In such event I prefer to have the two projections 12 on the spring 11 as illustrated in Fig. 5. When this interior holding member is omitted it is desirable to hold the holding pieces 5 and 6 against the inner face of the wall of the member 1 while the member 2 is being placed in position and this may be done by a temporary interior member which can be removed after the parts are in position. This will cheapen and lighten the construction.

I claim:

1. A device of the kind described comprising a hollow, angular member having an inner face and being provided with an opening which extends into the hollow thereof, said member being formed integral at the point where the opening is located, a connecting element comprising two separate coacting sections detachable from each other, each having a laterally extending holding piece adapted to be inserted in said opening when the sections are separated and to engage the inner face of said member, when the two sections are brought together, said sections when brought together forming a short hollow piece, a locking part in said hollow member movable substantially parallel to said holding parts and which holds them against the inner face of said member, and means for preventing the two sections of the connecting element from sliding transversely with relation to each other after they have been brought together.

2. A device of the kind described comprising two angular members, one of said members being hollow and having an inner face, said member being provided with an opening extending into the hollow thereof and being formed integral at the point where the opening is located, a connecting element comprising two sections each having a laterally extending holding piece adapted to be inserted in said opening to engage the inner face of the member provided with said opening, when the two sections are brought together, said sections when brought together forming a short hollow piece adapted to fit into a receiving opening in the first angular member, means in the angular member into which said lateral holding pieces are received for holding said lateral holding pieces against movement, means for preventing the two sections of the connecting element from sliding with relation to each other after they have been brought together, and locking mechanism for locking the first angular member and the connecting element together.

3. A device of the kind described comprising a hollow, angular member having an inner face and being provided with an opening which extends into the hollow thereof, said member being formed integral at the point where the opening is located, a connecting element comprising two separate sections each having a laterally extending holding piece adapted to be inserted in said opening, said sections when brought together forming a short hollow piece, an interior holding member adapted to be inserted in the member into which the lateral holding pieces are received and which fixes said lateral holding pieces in position between the interior holding member and the wall of said member, and means for preventing the two sections of the connecting element from sliding with relation to each other after they have been brought together.

4. A device of the kind described comprising a hollow, angular member having an inner face and being provided with an opening which extends into the hollow thereof, said member being formed integral at the point where the opening is located, a connecting element comprising two separate sections each having a laterally extending holding piece adapted to be inserted in said opening, said sections when brought together forming a short hollow piece, an interior holding member adapted to be inserted in the member into which the lateral holding pieces are received and which fixes said lateral holding pieces in position between the holding member and the wall of said member, a second member having a receiving opening into which said connecting element is received, means for preventing the two sections of the connecting element from sliding with relation to each other after they have been brought together, and means for removably locking said latter member to said connecting element.

5. A device of the kind described comprising an angular member having a hollow portion with an inner face and provided with an opening extending into the hollow portion and being formed integral at the point where the opening is located, a connecting element comprising two coacting sections detachable from each other and having portions which extend through said opening into said hollow portion, holding means for preventing longitudinal movement of said connecting element with relation to said member, and means forming a part of said sections and integral therewith for preventing the two sections of the connecting element from moving transversely with relation to each other after they have been brought together.

6. A device of the kind described comprising an angular member having a hollow portion with an inner face and provided with an opening extending into the hollow portion, a connecting element consisting of two separate sections each having a laterally extending holding piece adapted to be inserted in said opening and to engage the inner face of said member when the two sections are brought together, means in said member for holding said lateral holding pieces against movement away from the inner face of said member, a portion of the meeting edges of the sections of said connecting element being beveled so that when the sections are brought together relative sliding movement thereof is prevented.

7. A device of the kind described comprising an angular member having a hollow portion with an inner face and provided with an opening extending into the hollow portion, a connecting element consisting of two separate sections each having a laterally extending holding piece adapted to be inserted in said opening and to engage the inner face of said member when the two sections are brought together, means in said member for holding said lateral holding pieces against movement away from the inner face of said member, a portion of the meeting edges of the sections of the connecting element being beveled, one of said sections having a projection the other sections being provided with a receiving opening into which said projection is received, whereby relative sliding movement of the sections is prevented when they are brought together.

8. A device of the kind described comprising an angular member having a hollow portion with an inner face and provided with an opening extending into the hollow portion and being formed integral at the point where the opening is located, a connecting element consisting of two separate sections each having a laterally extending holding piece adapted to be inserted in said opening and to engage the inner face of said member when the two sections are brought together, means in said member for holding said lateral holding pieces against movement away from the inner face of said member, a portion of the meeting edges of the sections of the connecting element being beveled, one of said sections having a projection the other section being provided with a receiving opening into which said projection is received, said projection having a beveled edge which engages a beveled edge associated with the receiving opening, whereby relative sliding movement of the sections is prevented when they are brought together.

9. An article of manufacture comprising two metal sections which when pressed together form a hollow structure, one of said sections having a projection integral therewith, the other section being provided with a receiving opening into which said projection is received, said projection having a transversely beveled edge which engages a transversely beveled face associated with the receiving opening thereby preventing relative longitudinal and transverse sliding movement of the sections when they are brought together, said sections being detachable from each other so that they may be completely separated from each other by a relative, longitudinal separating movement.

10. A connecting element consisting of two separate sections each having a laterally extending holding piece, portions of the meeting edges of the sections of the connecting element being beveled, one of said sections having a projection integral therewith, the other section being provided with a receiving opening into which said projection is received, said projection having a transversely beveled edge which engages a transversely beveled face associated with the receiving opening whereby relative transverse, sliding movement of the sections is prevented when they are brought together, said sections being detachable from each other so that they may be completely separated from each other by a relative, longitudinal separating movement.

11. A device of the kind described comprising an angular member having a hollow portion, said hollow portion having an inner face, said member being provided with an opening extending into the hollow thereof and being formed integral at the point where the opening is located, a connecting element consisting of two separate sections each having a laterally extending holding piece adapted to be inserted in said opening and to engage the inner face of said member when the two sections are brought together, means in said member for holding said lateral holding pieces against movement away from the inner face of said member, a portion of the meeting edges of the sections of the connecting element being beveled, one of said sections having a projection the other section being provided with a receiving opening into which said projection is received, whereby relative sliding movement of the sections is prevented when they are brought together, a spring in said connecting element, a projection on said spring adapted to project through an opening in the connecting element, a second member having a receiving opening into which said connecting element is received and provided with an opening into which the projection on said spring projects, whereby the two members are removably locked together.

12. A device of the kind described comprising a hollow angular member provided with an opening extending into the hollow thereof, said member being formed integral at the point where the opening is located, a connecting element comprising two separate sections each having a laterally extending holding piece adapted to be inserted in said opening, said sections when brought together forming a short hollow piece, an interior holding member adapted to be inserted in the member into which the lateral holding pieces are received and which fixes said lateral holding pieces in position between the interior holding member and the wall of said member, and means for preventing the two sections of the connecting element from sliding with relation to each other after they have been brought together, a spring in said connecting element, a projection on said spring adapted to project through an opening in the connecting element, a second member having a receiving opening into which said connecting element is received and provided with an opening into which the projection on said spring projects, whereby the two members are removably locked together.

13. A device of the kind described comprising two angular members, one of said members being hollow and having an inner face, said member being provided with an opening extending into the hollow thereof and being formed integral at the point where the opening is located, a connecting element comprising two coacting sections detachable from each other, each having a laterally extending holding piece adapted to be inserted in said opening to engage the inner face of the member provided with said opening when the two sections are brought together a second hollow angular member having a receiving opening said sections when brought together forming a short hollow piece the other angular member being provided at its end with a receiving opening into which said short hollow piece is received, means for preventing the two sections of the connecting element from sliding transversely with relation to each other when they have been brought together, and locking means for locking said latter angular member and the connecting element together to form a rigid structure.

14. An article of manufacture comprising a hollow device composed of two co-acting metal sections detachable from each other and having flat sides, one of said sections having a receiving opening extending longitudinally thereof and the other having a projection on one of its flat sides in the plane extending longitudinally through the flat side containing it and adapted to be received within said opening through relative, longitudinal movement of said sections and means for preventing relative, transverse movement of said sections.

15. An article of manufacture comprising an angular member having a hollow portion having an inner face and being provided with an opening, extending into the hollow thereof a hollow connecting element projecting from said opening and having laterally extending holding pieces projecting on the interior of said element in opposite directions from said opening and removable means within said member for holding said connecting element in position.

In testimony whereof, I affix my signature this 17th day of December, 1919.

GUSTAVUS A. E. KOHLER.